United States Patent
Dautermann et al.

(10) Patent No.: US 10,520,073 B2
(45) Date of Patent: Dec. 31, 2019

(54) GEAR WHEEL

(71) Applicants: Bernd Dautermann, Kaufbeuren (DE); Michael Elbs, Kaufbeuren (DE); Armin Deschler, Schwabmuenchen (DE)

(72) Inventors: Bernd Dautermann, Kaufbeuren (DE); Michael Elbs, Kaufbeuren (DE); Armin Deschler, Schwabmuenchen (DE)

(73) Assignee: MAN Energy Solutions SE, Augsburg (DE)

( * ) Notice: Subject to any disclaimer, the term of this patent is extended or adjusted under 35 U.S.C. 154(b) by 789 days.

(21) Appl. No.: 14/951,891

(22) Filed: Nov. 25, 2015

(65) Prior Publication Data
US 2016/0186851 A1    Jun. 30, 2016

(30) Foreign Application Priority Data
Nov. 29, 2014    (DE) .................. 10 2014 017 755

(51) Int. Cl.
*F16H 55/14* (2006.01)
*F16H 55/17* (2006.01)

(52) U.S. Cl.
CPC ............. *F16H 55/14* (2013.01); *F16H 55/17* (2013.01)

(58) Field of Classification Search
CPC ........... F16H 55/14; F16H 55/17; F16H 55/18
USPC .......................................................... 74/443
See application file for complete search history.

(56) References Cited

U.S. PATENT DOCUMENTS

| | | | | |
|---|---|---|---|---|
| 1,180,495 A | * | 4/1916 | Headson | F16H 55/06 74/434 |
| 1,235,734 A | * | 8/1917 | Stange | F16H 55/14 74/443 |
| 2,744,417 A | * | 5/1956 | Huguenin | F16H 55/14 74/434 |
| 2,867,130 A | * | 1/1959 | Moeller | F16H 55/14 74/410 |

(Continued)

FOREIGN PATENT DOCUMENTS

| | | |
|---|---|---|
| DE | 1808162 U | 3/1960 |
| DE | 8710903 U | 6/1988 |

(Continued)

*Primary Examiner* — William C Joyce
(74) *Attorney, Agent, or Firm* — Cozen O'Connor

(57) ABSTRACT

A gear wheel (10), operable for transmitting substantial torques without developing or generating undue noise and exhibiting improved vibration damping, is axially mountable for operative rotation on a shaft (25) and includes a disc-shaped or cylindrical base body (11) that defines a recess (12) for passage of the shaft. The base body (11) carries a plurality of teeth (13, 14) radially distributed about the circumference of the base body. A disc-shaped damping element (17) is releasably connected to and against a side or face of the base body so as to accommodate relative movement between the base body and the damping element in response to dynamic loads acting on the operating gear wheel. A second damping element (17) can likewise be releasably connected to and against a second or opposite side or face of the base body so as to correspondingly accommodate relative movement between the base body and the second damping element in response to dynamic loads acting on the operating gear wheel.

14 Claims, 1 Drawing Sheet

(56) References Cited

U.S. PATENT DOCUMENTS

| | | | |
|---|---|---|---|
| 3,307,419 A | 3/1967 | Brickett et al. | |
| 3,581,593 A * | 6/1971 | Robinson | F16H 1/06 |
| | | | 181/207 |
| 3,843,188 A * | 10/1974 | Kirschner | B60B 17/0017 |
| | | | 188/379 |
| 3,857,296 A * | 12/1974 | Tsunoda | B23D 61/026 |
| | | | 74/443 |
| 4,635,501 A * | 1/1987 | Mizuno | F16H 55/14 |
| | | | 74/433.5 |
| 6,755,094 B2 * | 6/2004 | Rehle | F16F 15/10 |
| | | | 74/443 |
| 2006/0123942 A1 | 6/2006 | Facciolla | |

FOREIGN PATENT DOCUMENTS

| | | | |
|---|---|---|---|
| EP | 0 251 243 | * | 1/1988 |
| FR | 2678343 | * | 12/1992 |
| JP | 59-80563 | * | 5/1984 |
| WO | WO 81/00143 | | 1/1981 |

* cited by examiner

GEAR WHEEL

BACKGROUND OF THE INVENTION

1. Field of the Invention

The invention relates to a gear wheel, such as a gear wheel of a gearbox, that is specially constructed and operative for transmitting substantial torques without developing or generating undue noise and exhibiting improved vibration damping.

2. Description of the Related Art

Gear wheels of, for example, gearboxes are operable to transmit forces or torques. In particular because of fluctuations in stiffness in the meshing and engagement of gear teeth, noises commonly develop in the operation of such gearboxes and these noises can be or become annoying to operators and others in the vicinity of these apparatus. It is known in the prior art to provide specially configured or constructed gear wheels for the purpose and with the intention of reducing the presence and development of undesired noises.

DE 1 808 162 U, for example, discloses a vibration-dampened gear wheel in which, for damping of vibrations and corresponding reduction in the development of noise, an elastic layer—for example of plastic—is positioned extending radially between a radially inner steel bushing and a radially outer toothed rim of steel. Gear wheels constructed in this manner are not, however, suitable for transmitting high torques.

Another effort to provide a gear wheel that operates with low noise is disclosed in DE 87 10 903 U. In this case, the gear includes a radially inner hub part formed of a thermoplastic material of high mechanical strength and exhibiting a low damping factor, and a radially outer toothed rim part formed of a thermoplastic material of lower mechanical strength and exhibiting a high damping factor. Here too, however, the resulting gear wheel is not suitable for transmitting high torques.

There is, therefore, an unmet need for a gear wheel, in particular for gearbox applications, that exhibits a tendency toward low noise development yet is suitable for transmitting high torques.

SUMMARY OF THE INVENTION

In accordance with the present invention, a disc-shaped damping element is releasably connected on at least one side or face of the base body so as to accommodate relative movement, brought about by dynamic loads acting on the gear wheel during operation, between the base body and the associated damping element.

In a gear wheel constructed in accordance with the invention, a disc-shaped damping element is releasably connected to the base body on at least one side or face of the body, i.e. axially on or substantially against or abutting the base body. A releasable connection between the damping element and the base body allows for relative movement between the base body and the damping element in response to operational forces or torques on the assembly. As a result, vibrations of the gear wheel caused in particular and by way of illustration by fluctuations in the stiffness of tooth engagement or meshing from, for example, the presence of alternating loads on the gear wheel can be reduced and, as a consequence, the development of noise counteracted. Gear wheel constructions in accordance with the invention are particularly well suited for applications in which the gear wheels are used in or form a part of gearboxes which, as is known, in many applications must often operationally transmit high torques.

In an advantageous feature of the inventive gear wheel, the damping element—or, in some embodiments, each of multiple such damping elements—is releasably connected to the basic body such that the relative movement, caused by loads acting on the gear wheel during its operation, between the base body and the damping element is in an amount in the sub-micrometer to micrometer range and is directed in the circumferential and/or radial direction. This relative movement, in the circumferential and/or radial direction and in the sub-micrometer to micrometer range, between the damping element and the base body of the gear wheel results in particularly advantageous vibration damping characteristics and a notable reduction of noise development associated with the operating gear wheel.

In an embodiment of the invention, the or each such damping element is releasably connected to the base body by screws, preferably so that first screws connect the damping element to the base body radially inside proximate or adjacent to the recess for the axial gear shaft, and second screws connect the damping element to the base body radially outside proximate or adjacent to the teeth. Connection of the damping element to the base body of the gear wheel using screws is particularly simple and, as such, currently preferred.

In a further feature or embodiment of the invention, the damping element is directly releasably connected to the base body so that, with relative movements between the damping element and base body caused by loads acting on the operating gear wheel, friction forms or is generated between the damping element and the base body, and more particularly between the adjoining end faces of the damping element and the base body. This construction is particularly advantageous for effective vibration damping and reduction of noise development.

These and other objects and features of the present invention will become apparent from the following detailed description considered in connection with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawing, wherein similar reference characters denote similar elements throughout the several embodiments and views.

DETAILED DESCRIPTION OF THE PRESENTLY PREFERRED EMBODIMENTS

The present invention relates to a gear wheel for transmitting torques, in particular such as a gear wheel of a gearbox that is operable for transmitting high torques, as for example a gearbox for a vertical rolling mill or an extruding drive.

Figure 1:
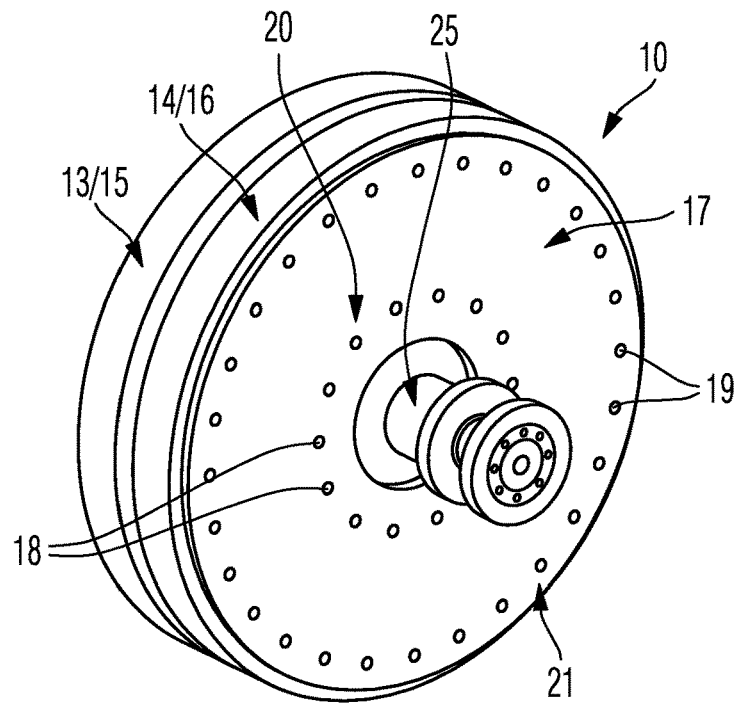
FIG. 1 is an elevated perspective view of a gear wheel constructed in accordance with the present invention.
Figure 2:
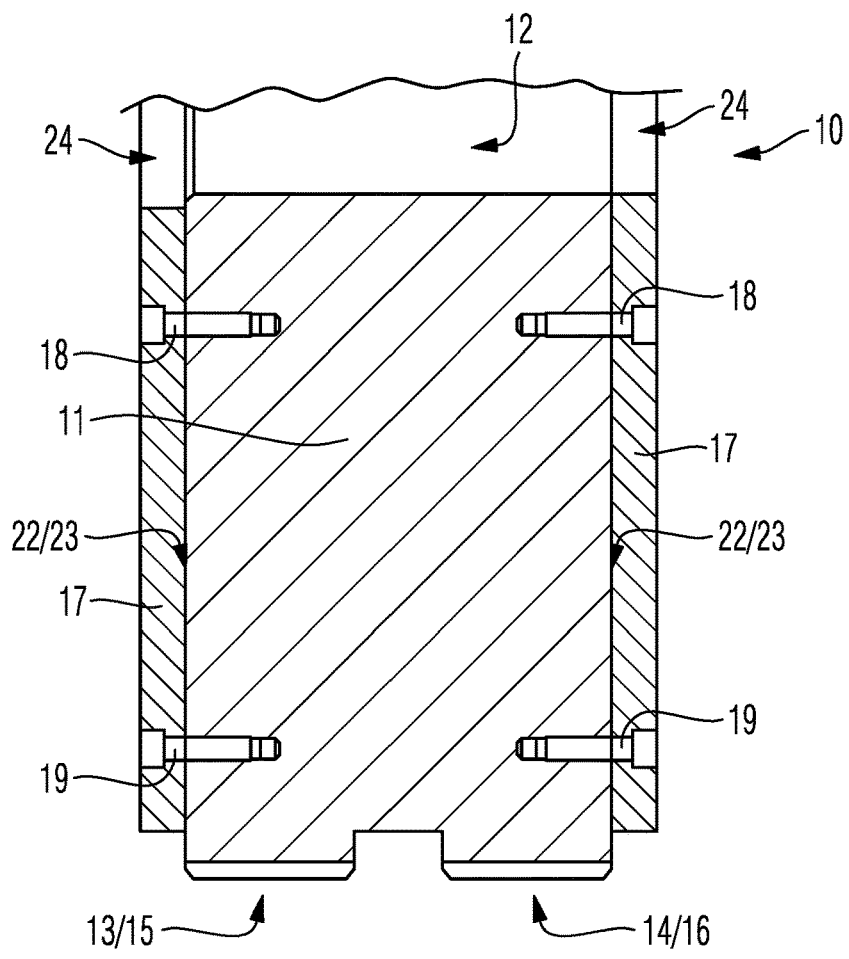
FIG. 2 is a cross-sectional partial view through the gear wheel of FIG. 1.

The gear wheel 10 depicted in FIGS. 1 and 2 has a disc-shaped or cylindrical base body 11 disposed radially within gear wheel 10 which defines a recess 12 for the passage of an axial shaft 25. The base body 11 of gear wheel 10 may, as is known, be shrunk or contracted onto (or otherwise mounted on or about) the shaft 25.

Radially distributed along the outer circumference of the base body 11 of gear wheel 10 are a plurality of teeth. In the embodiment depicted in the drawings, closely similar or identical first teeth 13 and second teeth 14 provide helically-toothed rims 15 and 16, respectively.

As will be apparent to those skilled in art, however, the inventive gear wheel need not be constructed as such a double helically-geared wheel, and embodiments having or incorporating by way of example a single helically-geared wheel and/or with straight-gear wheels should be understood as being within the intended scope and contemplation of the invention.

A disc-shaped damping element 17 is releasably connected to the base body 11 of gear wheel 10 on or against at least one side or face of the body 11. In the illustrated embodiment of a double helically-geared wheel 10 in FIGS. 1 and 2, a separate disc-shaped damping element 17 is releasably connected to the base body 11 on each of the two opposite sides or faces thereof, so as to accommodate relative movements between the base body 11 and each of the damping elements 17 in response to operating forces and operating torques or stiffness fluctuations in the toothed engagement of wheel 10.

As currently preferred, in the depicted embodiment this relative movement between base body 11 and each of the damping elements 17 lies in the sub-micrometer to micrometer range, in particular between about 0.01 μm and 10 μm.

Each of the damping elements 17 shown in FIGS. 1 and 2 is releasably connected to base body 11 by screws 18, 19 on the respective side of body 11. In the depicted embodiment, first radially-inner screws 18 releasably connect each damping element 17 to base body 11 adjacent to or proximate the shaft-accommodating recess 12 of body 11, and second radially-outer screws 19 releasably connect each damping element 17 to base body 11 adjacent to or proximate the teeth 13, 14 of body 11. As seen in FIG. 1, each of the first and second screws 18, 19 are, in this particular embodiment, substantially evenly distributed circumferentially about damping elements 17 and form or define rings 20, 21 of the screws 18, 19.

The attachment of the damping elements 17 to base body 11 via the screws 18, 19 allows and accommodates the desired relative movement during operation between the damping elements and the base body 11 of gear wheel 10. In addition, screws 18, 19 releasably connect each damping element 17 directly to base body 11 so that, during relative movement therebetween caused by operational loads or vibrations of the gear wheel 10, friction that develops or is generated between the respective damping element 17 and base body 11 effectively counteracts vibrations, thus reducing the development of noise.

The adjoining or abutting end faces 22, 23 of base body 11 with each respective damping element 17 thus rub against one another during operation of the gear wheel as a result of the relative movement between the base body 11 and damping elements 17.

Each damping element 17 of gear wheel 10, like the base body 11 of the gear wheel, includes a defined recess 24 for accommodating passage of the shaft 25. In the embodiment of the invention shown in the drawings, the inner diameter of the recess 24 of at least one of the disc-shaped damping elements 17 substantially corresponds to the inner diameter of the recess 12 of base body 11 of the gear wheel 10 and the outer diameter of shaft 25.

More particularly, in the embodiment shown in FIGS. 1 and 2 gear wheel 11 abuts a shoulder of shaft 25 at the left face end of base body 11. Accordingly, the disc-shaped damping element 17 that is positioned on that left side of base body 11 defines a shaft passage recess 24 having a slightly larger inner diameter that is adapted to accommodate the shoulder of shaft 25.

Each disc-shaped damping element 17 has an axial thickness that is smaller than the axial thickness of base body 11.

The outer diameter of the each disc-shaped damping element 17 is smaller than the outer diameter of base body 11, so that the teeth 13, 14 are accessible without interfering with their meshed engagement with the teeth of an adjoining gear wheel or other element.

In preferred embodiments, the base body 11 of gear wheel 10 and the damping elements 11 are produced from similar materials of similar hardness and, by way of preferred example, are produced from steel.

Thus, the present invention provides a gear wheel of a gearbox 10, comprising a base body 11 carrying teeth 13, 14, and a disc-shaped damping element 17 releasably connected, on at least one side or face of the body 11, such that operating loads acting on gear wheel 10 cause relative movement between the damping element 17 and the base body 11. This relative movement preferably runs in the circumferential and/or radial direction and lies in the sub-micrometer to micrometer range. In the preferred embodiments herein described, the (or each) damping element 17 is directly connected to base body 11 of gear wheel 10 so that friction is generated between the adjacent or abutting end faces 22, 23 of the damping element 17 and base body 11. As a result of this construction and operating functionality, undesirable vibrations and the development of noise during operation and use of the gear wheel 10 is effectively counteracted and substantially eliminated or reduced.

The invention is not limited by the embodiments described above which are presented as examples only but can be modified in various ways within the scope of protection defined by the appended patent claims.

We claim:

1. A gear wheel axially mountable for operative rotation on a shaft, comprising:
   a base body defining a recess sized for passage of the shaft and having a plurality of teeth distributed radially along a circumference of the base body, wherein a first side of the base body is a planar radial first wall extending from the recess to the circumference of the base body, and wherein a second side of the base body is a planar radial second wall extending from the recess to the circumference of the base body; and
   a first disc-shaped damping element releasably entirely connected directly to and against the first side of the base body so as to accommodate relative movement between the base body and the damping element in response to dynamic loads acting on the operating gear wheel,
   wherein the first damping element has a radially outermost diameter that is smaller than a radially outermost diameter of the base body;
   wherein the first damping element has a recess that defines a radially inner most diameter that is substantially equal to the base body recess; and wherein the base body and the first damping element are produced from similar materials having similar hardness.

2. The gear wheel in accordance with claim 1, wherein the releasable connection between the first damping element and the base body is configured to accommodate said relative movement in the sub-micrometer to micrometer range.

3. The gear wheel in accordance with claim 2, wherein said relative movement is in the range of approximately 0.01 micrometers and 10 micrometers.

4. The gear wheel in accordance with claim 2, wherein said relative movement is directed in at least one of radially and circumferentially.

5. The gear wheel in accordance with claim 1, wherein said releasable connection of the first damping element and the base body comprises screws.

6. The gear wheel in accordance with claim 1, wherein said releasable connection of the first damping element and the base body comprises first screws disposed radially inside proximate the base body recess at a first radial distance from the base body recess and second screws disposed radially outside proximate the base body teeth at a second radial distance from the base body recess, wherein the second radial is greater than the first radial distance.

7. The gear wheel in accordance with claim 1, wherein the first damping element has a thickness that is smaller than a thickness of the base body.

8. The gear wheel in accordance with claim 1, further comprising a second disc-shaped damping element releasably connected to and against the second side of the base body so as to accommodate relative movement between the base body and the second damping element in response to dynamic loads acting on the operating gear wheel.

9. The gear wheel in accordance with claim 8, wherein each of the damping elements is directly releasably connected to the base body so that said relative movement between the each damping element and the base body generates friction between abutting end faces of the each damping element and the base body.

10. The gear wheel in accordance with claim 1, wherein the gear wheel forms a part of a gear box.

11. The gear wheel in accordance with claim 1, wherein the first damping element extends radially from the recess to an area proximate to the plurality of teeth distributed radially along the circumference of the base body, wherein the first damping element is configured to avoid interfering with engagement of the teeth of the first damping element with corresponding teeth of an adjoining element.

12. The gear wheel in accordance with claim 1, wherein the first damping element has opposing radially extending planar sides.

13. A gear wheel axially mountable for operative rotation on a shaft, comprising:
   a base body defining a recess sized for passage of the shaft and having a plurality of teeth distributed radially along a circumference of the base body, wherein a first side of the base body is a planar radial first wall extending from the recess to the circumference of the base body; and
   a first disc-shaped damping element releasably entirely connected directly to and against the first side of the base body so as to accommodate relative movement between the base body and the damping element in response to dynamic loads acting on the operating gear wheel
   a second disc-shaped damping element releasably connected to and against a second side of the base body so as to accommodate relative movement between the base body and the second damping element in response to dynamic loads acting on the operating gear wheel, wherein the second side of the base body is a planar radial second wall extending from the recess to the circumference of the base body,
   wherein an inner diameter of the second disc-shaped damping element is larger than the inner diameter of the first damping element;
   wherein the first damping element has a recess that defines a radially inner most diameter that is substantially equal to the base body recess; and wherein the base body and the first damping element are produced from similar materials having similar hardness.

14. The gear wheel in accordance with claim 13, wherein the second damping element is directly releasably connected to the base body so that said relative movement generates friction between abutting end faces of the first damping element and the base body.

* * * * *

UNITED STATES PATENT AND TRADEMARK OFFICE
CERTIFICATE OF CORRECTION

PATENT NO. : 10,520,073 B2
APPLICATION NO. : 14/951891
DATED : December 31, 2019
INVENTOR(S) : Bernd Dautermann et al.

Page 1 of 1

It is certified that error appears in the above-identified patent and that said Letters Patent is hereby corrected as shown below:

On the Title Page

Item (73) should read:
(73) RENK Aktiengesellschaft

Signed and Sealed this
Eleventh Day of August, 2020

Andrei Iancu
*Director of the United States Patent and Trademark Office*